Patented Dec. 14, 1943

2,336,634

UNITED STATES PATENT OFFICE 2,336,634

MILK TREATMENT PROCESS

David D. Peebles, Berkeley, Calif., assignor to Golden State Company, Ltd., San Francisco, Calif., a corporation of Delaware No Drawing. Application December 12, 1939, Serial No. 308,817

2 Claims. (Cl. 99—57)

This invention relates generally to milk products suitable for bread making, and to processes for their manufacture.

In an effort to make available milk products which are not as expensive as skim milk, unsuccessful attempts have been made to use raw liquid whey such as is produced as a by-product in the manufacture of cheese. The protein content of raw liquid whey seems to be of such a character that it produces a bound loaf, possibly because the proteins coagulate before the loaf has had an opportunity to rise properly. By a bound loaf I have reference to a loaf of insufficient volume for the quantity of ingredients employed, which deficiency is usually accompanied by poor texture and body.

It is a primary object of the present invention to provide a process for the treatment of raw liquid whey which will result in a product suitable for bread making. More particularly, the product obtained in accordance with the present invention, and made from raw liquid whey, can be used successfully in various bread mixes without causing the loaf to become bound, and with the production of a bread loaf of proper volume having a uniform texture and proper desired body.

Further objects of the invention will appear from the following description in which the preferred embodiment of the invention has been set forth in detail.

In carrying out the present invention I first acidulate raw liquid whey, such as is formed as a by-product in the manufacture of Cheddar cheese, with an inorganic acid like sulphuric acid. Good results can be secured by using sulphuric acid in such amounts that an initial acidity of 0.18% is increased to from 0.34% to 0.35%, after the acid has been added. With Cheddar cheese whey having an initial acidity of 0.18%, this amounts to about one quart of sulphuric acid for each 10,000 lbs. of raw whey.

After the acid has been properly dispersed throughout the mass of material, a neutralizing agent is added to bring the acidity back to a point near neutrality. A suitable neutralizing agent is calcium hydroxide, which can be added in dry form, to bring the acidity to about 0.2%. In the foregoing example, about ten pounds of lime will suffice for 10,000 pounds of whey.

Following partial neutralization as described above, the whey is subjected to rapid heating to elevated temperature to a value of the order of from 100 to 180° F. The heating may be carried out by direct contact with steam, since the heat transfer afforded by such treatment can be quite rapid without causing burning such as might result from contact with heated surfaces. Heating may also be carried out by a suitable heat exchanger having high liquid flow velocities and capable of rapidly heating the material to the desired temperature without burning.

Following the treatment described above, the whey is then concentrated by evaporation in suitable evaporating equipment. The evaporating equipment preferably operates under vacuum, and throughout this evaporating cycle the material should not be heated to a temperature greater than about 180° F. The evaporation may be carried out in a number of stages, by use of evaporating equipment such as a Peebles and Manning evaporator (see Patent No. 2,090,985). The final stages of evaporation should be under high vacuum, and it is desirable to increase the final concentration to about 50 to 55% solids.

The concentrate produced as described above can be used directly in bread making, but it has comparatively poor keeping qualities. Therefore, it is desirable to convert this concentrate to the form of a stabilized powder, as for example by the use of the spray drying process disclosed and claimed in Peebles and Manning Patent No. 2,088,606. The final product is in the form of a non-hygroscopic granular powder, in which the lactose content contains water of crystallization.

The product obtained as described above is a relatively inexpensive material containing desirable food properties which can be used as an ingredient in various bread mixes, in place of whole milk or skim milk. At the time it is introduced into a bread mix it can be first mixed with water, and then introduced into the other ingredients of the mix. The amount of material used may vary in practice, but as a typical example, about six pounds of my dried whey product can be used with each 100 pounds of flour. Due to the peculiar way in which the whey proteins are conditioned by the treatment described, there is no undesirable viscosity effect tending to hinder proper rising of the loaf, and there is a properly timed coagulation of proteins during baking of the loaf, to afford a firm and uniform cell structure. Thus there is no undesirable binding of the loaf such as is experienced with untreated raw whey or ordinary powder, and a loaf of proper volume is produced to meet modern baking requirements. Bread made by the use of my product is not only of relatively high quality, but in addition it has good keeping properties.

I claim:

1. The process of manufacturing a concentrated milk product capable of being employed in substantial amounts in bread without causing substantial binding of the bread, which process comprises, acidulating unheated raw sweet whey having an acidity close to neutrality by adding a mineral acid in sufficient amount to bring the acidity of the whey to about 0.34% to 0.35%, neutralizing the acidulated whey to again bring the acidity thereof close to neutrality, thereafter rapidly heating the neutralized whey to a temperature between approximately 100 and 180° F. which will condition the whey proteins without causing substantial coagulation thereof, and thereafter concentrating the conditioned whey by vacuum evaporation.

2. The process of manufacturing a concentrated milk product capable of being employed in substantial amounts in bread without causing substantial binding of the bread, which process comprises, acidulated unheated raw sweet whey having an acidity of approximately 0.18% by adding sulfuric acid in sufficient amount to bring the acidity of the whey to about 0.34% to 0.35%, neutralizing the acidulated whey by adding sufficient calcium hydroxide to bring the acidity of the whey to approximately 0.2%, thereafter rapidly heating the neutralized whey to a temperature between approximately 100 and 180° F. which will condition the whey proteins without causing substantial coagulation thereof, thereafter concentrating the conditioned whey by vacuum evaporation to a solid content of approximately 50 to 55% and spray drying the concentrated whey to produce a powdered milk product.

DAVID D. PEEBLES.